P. BACHER.
METHOD OF MAKING COLLAPSIBLE CORES.
APPLICATION FILED APR. 20, 1914.

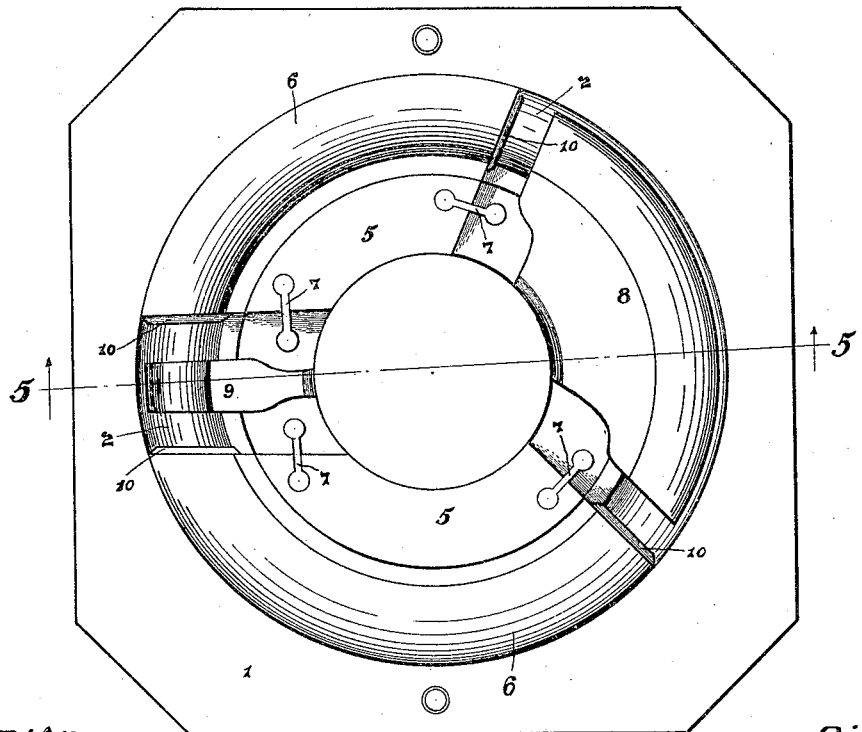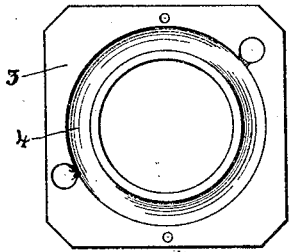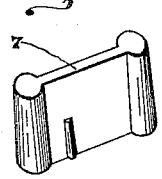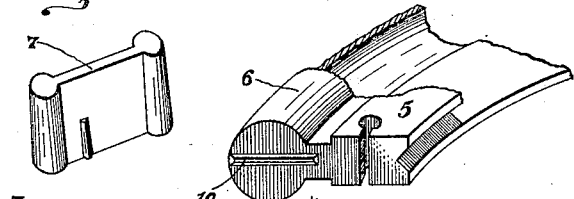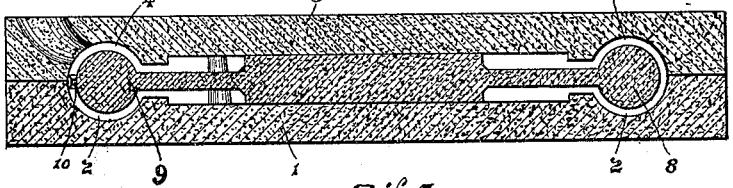

1,139,325.

Patented May 11, 1915.
2 SHEETS—SHEET 2.

Witnesses
Robert Karcher
Sylvia Boron

Inventor
Peter Bacher
By Bond & Miller
Attorneys

THE NORRIS PETERS CO., PHOTO-LITHO., WASHINGTON, D. C.

UNITED STATES PATENT OFFICE.

PETER BACHER, OF CANTON, OHIO.

METHOD OF MAKING COLLAPSIBLE CORES.

1,139,325.

Specification of Letters Patent.

Patented May 11, 1915.

Application filed April 20, 1914. Serial No. 833,073.

*To all whom it may concern:*

Be it known that I, PETER BACHER, a citizen of the United States, residing at Canton, in the county of Stark and State of Ohio, have invented certain new and useful Improvements in Methods of Making Collapsible Cores, of which the following is a specification.

My invention relates to the method of making collapsible cores to be used for molding rubber tires or analogous articles. Cores of this character are usually made of metal either cast or wrought and originally cast or formed in rings or what might be termed hoops of a diameter corresponding substantially with the diameter of the wheels upon which a finished pneumatic tire is to be placed. The body of the ring is usually formed hollow, owing to the fact that when made solid it is unhandy to manipulate the same by reason of its weight. In order to remove the core after the tire has been formed it is necessary to have the ring made up of segmental sections, preferably four, but a greater number may be employed. Heretofore it has been customary to first cast or form the core in a single piece and afterward cut the ring by sawing so that after a tire has been molded, the various segments can be removed one at a time. To thus saw or cut the ring or core into sections or segments is in the first instance expensive, and in the second instance, the work must be accurate and very carefully done; otherwise the exact original form is lost.

The object of my improved method is to cast the various segments going to make up a complete collapsible core and then assemble the segments separately cast to produce the complete collapsible core without first making a complete core and then cutting the same into segments.

A further object of my method is to provide for properly connecting the abutting ends of the segmental sections together.

My improved method also facilitates the economical manufacture of collapsible cores and lends itself admirably to the formation of a complete collapsible core formed in sections without any skilled labor being necessary.

Figure 6:
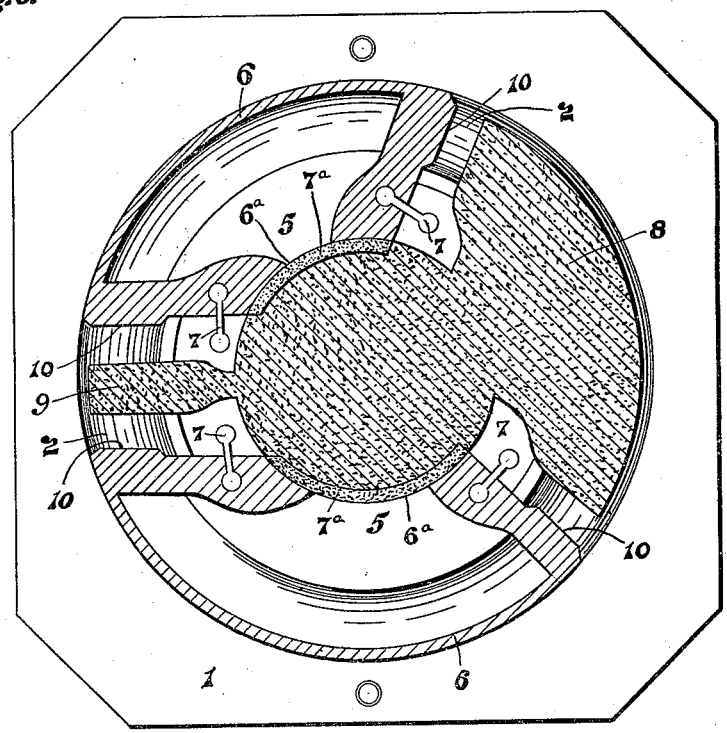
Figure 7:
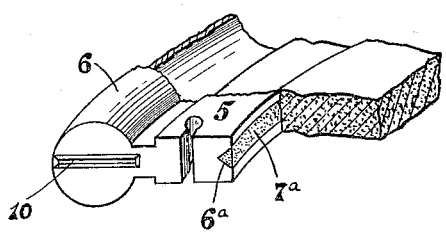

In the accompanying drawing: Figure 1 is a plain top view of one of the mold sections, showing two of the segments of the core placed in proper position, said sections being what might be termed the chill sections or segments. Fig. 2 is a view of what might be termed the top portion or member of the mold. Fig. 3 is a detached perspective view of one of the segmental connecting members. Fig. 4 is a detached perspective view showing a portion of one of the chill segmental sections. Fig. 5 is a transverse section taken on line 5—5, Fig. 1, except that the two molds, that is the top and bottom molds are placed in proper relative position with reference to each other, while Fig. 1 does not show but one, which is the lower one shown in Fig. 5. Fig. 6 is a horizontal section showing the chill members in proper relative position with reference to the core, and also showing the filling placed in proper position. Fig. 7 is a detached perspective view showing a portion of one of the chill segmental sections or members showing the filler placed in the groove.

Similar numerals of reference indicate corresponding parts in all the figures of the drawings.

In the accompanying drawings 1 represents the mold or more specifically speaking the sand portion of the mold, but does not illustrate the flask. The mold 1 is chambered or more specifically provided with the annular groove 2 and the mold 3 also provided with the annular groove 4, said mold being formed of sand, which grooves are formed in the usual way by suitable patterns, the molds also being formed to receive the web or inward extending flanges 5, the flanges being originally cast with the chill members 6.

The method of forming or casting the chill members 6 is preferably the same as the casting of any metal form except that the various connecting members 7 are not cast with the chill members, but are preferably formed separate and placed in position to act as chills, and when the chill members 6 are placed in the mold, said connecting members are also placed or connected to the ends of the chill members 6, by which arrangement the segmental sections last cast and at which time the sections 6 are used as chills, the connecting members 7 are also used as chills.

In order to prevent the welding of the segmental members cast against the ends of the chill members 6 the ends of said members or the parts of said members against which the molten metal comes in contact should be coated with paraffin or other suitable coating. In order to provide a sufficient body of cold metal against which the molten metal comes in contact, the ends of the chill members 6 are formed solid as best illustrated in Fig. 4, by which arrangement a sufficient amount of cold metal is brought into the proper position to make a complete chill and prevent the chill from becoming overheated and eliminating the possibility of any welding as between the chill members 6 and the afterward cast members.

It will be understood that in carrying out my process the cores 8 and 9 are formed of the shape and size to produce the desired shape and size of the chamber or hollow portion of the segmental sections. After the molds have been placed in the position illustrated in Fig. 5, the molten metal is poured into the mold filling the space between the ends of the chill members 6 and the space not occupied by the cores 8 and 9 and after these castings have been made the last cast members or segments together with the chill members can be removed from the mold, one section at a time, thereby producing without cutting a collapsible core.

In order to provide for flanges and grooves at the ends of the segments designed to be joined together, the chill members 6 should be provided with flanges 10, said flanges, also acting as chills whereby corresponding shaped grooves are formed in the last cast members or sections, by which method a perfectly finished collapsible core is produced.

It will be understood that the connecting members must be first driven out or removed after which the various segmental members, both the chill members and the last cast members can be easily detached from each other.

In carrying out my method to produce a collapsible core, one of the cast members should be so formed that its ends will be practically parallel, so that the members can be moved laterally or what might be termed inwardly after the tire has been properly molded.

For the purpose of preventing the molten metal from entering the hollow chill members 6 the groove 6ª should be closed by a core or filler 7ª, the only object being to present a solid surface at the ends of the chill members so that when the molten metal is poured into the pour holes such as are common in molds it cannot find its way into the hollow chill members. It will be understood that two pour holes must be employed as there are two spaces to be filled; that is to say there are two segmental sections to be cast against the ends of two segmental chill sections or members. The filling of the groove to prevent the molten metal from entering the hollow chill does not within itself form any part of the present invention.

Having fully described my invention what I claim as new and desire to secure by Letters Patent, is—

The herein described method which consists in producing segmental sections and segmental connecting members, coating the ends of said sections and connecting members with non-weldable material, placing said sections and connecting members in a mold in spaced relationship and casting segmental sections in the mold and chilling the same against the coated ends of the segmental sections and connecting members.

In testimony that I claim the above, I have hereunto subscribed my name in the presence of two witnesses.

PETER BACHER.

Witnesses:
  ALBERT HOEFFER,
  JOHN YENICKZ.